(12) United States Patent
Inoue (10) Patent No.: US 6,654,179 B2
(45) Date of Patent: Nov. 25, 2003

(54) WIDE CONVERTER LENS SYSTEM FOR BOTH UNDERWATER AND ABOVE-WATER USE

(76) Inventor: Akihide Inoue, 3-9-6 Dai, Kamakura, Kanagawa 247 (JP)

( * ) Notice: Subject to any disclaimer, the term of this patent is extended or adjusted under 35 U.S.C. 154(b) by 45 days.

(21) Appl. No.: 10/053,330

(22) Filed: Jan. 16, 2002

(65) Prior Publication Data

US 2003/0133199 A1 Jul. 17, 2003

(51) Int. Cl.$^7$ ............................................. G02B 15/02
(52) U.S. Cl. ...................... 359/672; 359/673; 359/675
(58) Field of Search ................................ 359/672–674, 359/749–753, 691; 396/14–16, 25–29

(56) References Cited

U.S. PATENT DOCUMENTS

| | | | | |
|---|---|---|---|---|
| 4,406,524 A | * | 9/1983 | Campiche | 359/744 |
| 4,856,880 A | * | 8/1989 | Ohshita | 359/753 |
| 5,400,072 A | * | 3/1995 | Izumi et al. | 348/335 |
| 5,949,588 A | * | 9/1999 | Ohshita et al. | 359/753 |
| 6,270,454 B1 | * | 8/2001 | Sano et al. | 600/178 |

* cited by examiner

Primary Examiner—Jordan M. Schwartz
Assistant Examiner—Jessica Stultz
(74) Attorney, Agent, or Firm—Beyer Weaver & Thomas LLP (57) ABSTRACT

A wide converter lens system includes an assembly of two or more specified kinds of lens units and a meniscus concave lens to be attached in front of this assembly. The frame for this assembly is detachably attachable to a watertight underwater housing containing a camera in a non-airtight, non-watertight manner so as to increase the field angle of the camera. The assembly of lenses includes at least a plano-concave lens with its flat surface facing forward away from the camera and a plano-convex lens with its flat surface facing the camera. In between, there may be any number of lenses such as an achromatic double lens combination for correcting distortions and aberrations of different types. The meniscus concave lens is provided with a sealing mechanism for detachably attaching itself to the front part of the frame of the lens assembly and serves to further increase the field angle of the camera in water.

16 Claims, 7 Drawing Sheets

WIDE CONVERTER LENS SYSTEM FOR BOTH UNDERWATER AND ABOVE-WATER USE

BACKGROUND OF THE INVENTION

This invention relates to a wide converter lens system for both underwater and above-water photography. Explained more in detail, a lens system adapted to be attached in front of the main lens of a camera in order to convert its effective focal length (or the field angle) is often referred to as a front converter, or simply as a converter. This invention relates to such a lens system adapted particularly to convert the effective focal length of the camera lens so as to make it function as a wider-angle lens, referred to as a wide converter, attachable to a water-proof camera housing enclosing the camera therein. More particularly, the invention relates to a multi-functional system of this kind especially suited for underwater photography but also usable under above-water conditions.

There has recently been a remarkable progress in the technology of electronic apparatus such as digital cameras and video cameras having a CCD image capturing device and optical instruments such as cameras for a 35 mm film and cameras for a new film having a magnetic memory part. Progress in miniaturization and multiple functionality has also been remarkable. For underwater photography, divers carry cameras of these kinds enclosed inside a waterproof housing. In spite of the general insufficiency of available light in the case of underwater photography, it is becoming possible to produce equally high-quality underwater pictures as pictures taken under an above-ground condition, thanks to the recent improvement in the photographic instruments.

Most popularly used cameras, however, are designed as a land camera with a fixed focal length of 38 mm or 45 mm somewhat on the wide-angle side. Even cameras with a zoom capability are usually designed as a land camera with the field angle (or the light-receiving angle) of the lens selected to cover a portion of the so-called wide-angle region and a portion also of the so-called telephoto region such as the range of 35–70 mm. When such a camera is used in water, it cannot function as a wide-angle camera. In other words, since the index of refraction of water is 1.33 and considerably higher than that of air (=1.00), a lens with a fixed focal length of 35 mm or 45 mm in the above-water condition (or in air) will function in water as a lens with a focal length of 50 mm or 65 mm, and a zoom lens of focal length 35–70 mm in air will function as a zoom lens of focal length about 50–100 mm in water. In either case, the lens will not function as a wide-angle lens.

With such a lens without a wide-angle capability, it is not possible to photograph a dynamic underwater scenery or a large group of fish. A wide conversion lens system is a peripheral device for such an application, being a kind of supplementary lens system and adapted to be set in front of a camera lens to vary the angle of its field of vision in a simple manner, enlarging it into the wide-angle side.

Conventionally, both lens makers and users regarded wide converter lens systems merely as one of simple single-function camera accessories capable of easily expanding the field of vision into a wide-angle region and there was not available any carefully designed wide conversion lens system of a high quality. Thus, prior art wide conversion lens systems were under a strict price limitation and were of a simple lens structure such that the image and color qualities were often adversely affected in peripheral areas. Moreover, wide conversion lens systems for underwater and above-water uses were being developed and produced as different single-function devices.

In the meantime, with the recent development in digital cameras and video cameras, cameras themselves have become high-precision electronic instruments requiring delicate handling because they are easily damaged, for example, by a small amount of water or sand. Thus, cameras enclosed in a waterproof housing have come to be used for underwater photography and also heavy-duty cameras protected against dust and water droplets have come to be used as land cameras.

SUMMARY OF THE INVENTION

It is therefore an object of this invention to provide a lens system serving as a wide converter with which a larger field angle can be attained even in an underwater condition.

It is another object of this invention to provide such a lens system for allowing a camera to be used as a wide-angle camera both under underwater and above-ground conditions.

A wide converter lens system embodying this invention, with which the above and other objects may be accomplished, is characterized as comprising what is herein referred to as a converter which is an assembly of two or more specified kinds of lens units and a forwardly protruding meniscus lens to be attached in front of this assembly. The expression "lens unit" will be used herein to indicate both a single lens and two or more lenses pasted together to form a single combination. The converter is detachably attachable to the camera, that is, to the watertight underwater housing containing the camera in a non-airtight, non-watertight manner so as to increase the field angle of the camera. The assembly of lens units includes at least a forwardly disposed one having a negative refractive power and a backwardly disposed one having a positive refractive power. According to a preferred embodiment, the former is a plano-concave lens or lens unit with its flat surface facing forward away from the camera and the latter is a plano-convex lens or lens unit with its flat surface facing the camera such that the converter can used equally conveniently in the above-water condition. Between these two lens units, the converter may further include any number of lenses or lens units for the purpose of correcting different kinds of distortions and aberrations. The meniscus lens is usually a concave lens and is provided with a mechanism for detachably attaching itself to the front part of the frame of the converter in a watertight manner and serves to further increase the field angle of the camera in water. Such an attaching mechanism may be either on the meniscus lens itself or on the frame to which it is to be attached.

As a variation, a transparent plate with flat surfaces may be provided between the camera and the converter, attached to the converter in an airtight and watertight manner and adapted to be attached to the camera housing in a non-watertight and non-airtight manner. In other words, a meniscus lens according to this invention may be designed to be attachable to a converter of this type having a flat transparent plate in order to further increase the field angle of the camera.

The plano-concave lens or lens unit of the converter need not be strictly plano-concave as long as its front surface has a radius of curvature sufficiently large such that the converter can serve as a wide converter in water. Similarly, the meniscus lens need not be concave, depending on the specifications of the converter, as long as the radii of curvature of its surfaces are so designed that the field angle of the camera can be increased to a desired angle, when the meniscus lens thus designed is attached to the converter for an underwater use.

BRIEF DESCRIPTION OF THE INVENTION

DETAILED DESCRIPTION OF THE INVENTION

Broadly explained with reference to FIGS. 1–3, a wide converter lens system embodying this invention for photography under both underwater and above-water (in air) conditions comprises what may hereinafter be referred to as a converter 20 and a meniscus attachment lens 10. They will each be explained next sequentially more in detail.

Figure 1:
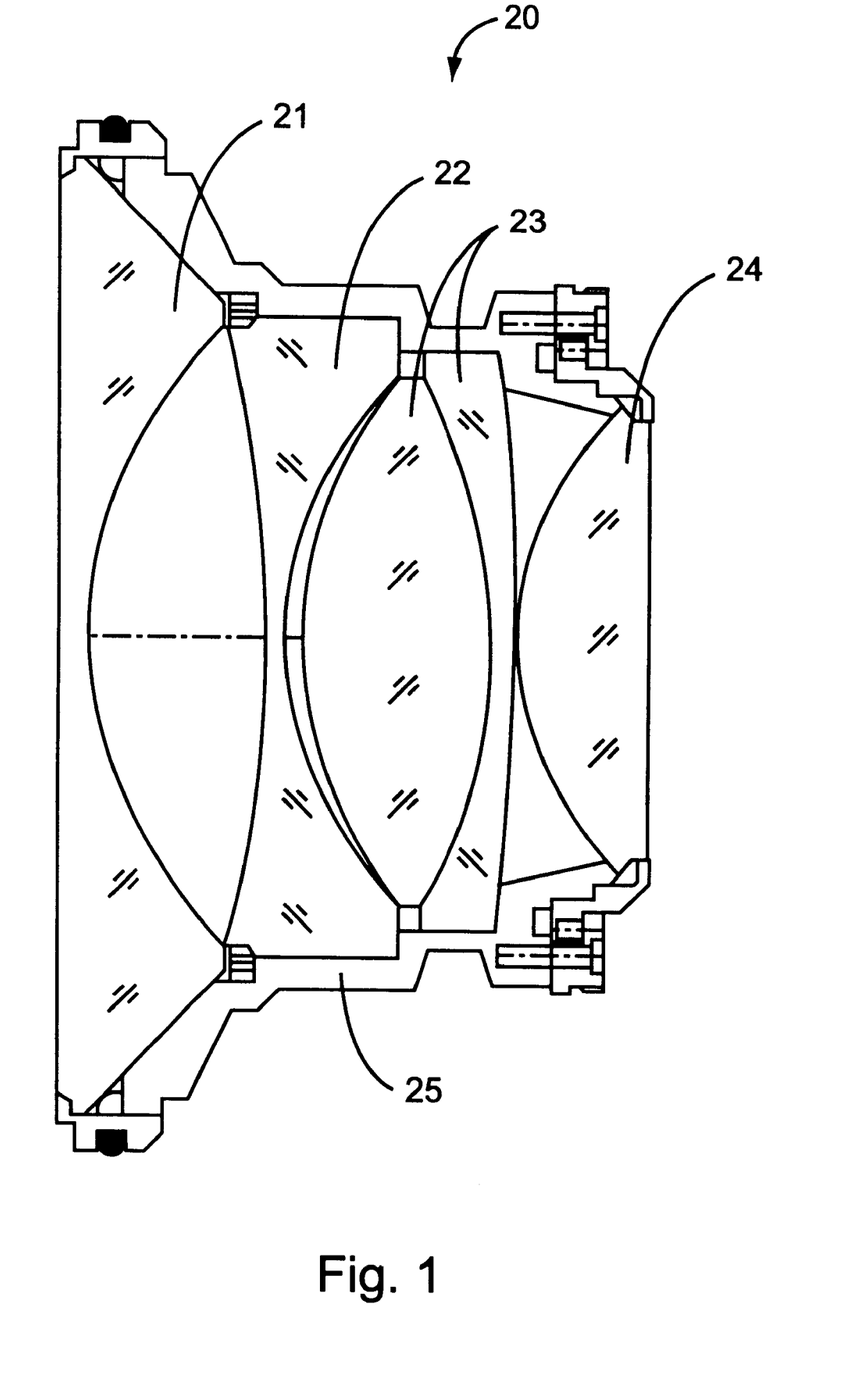
FIG. 1 is a sectional view of a converter as a portion of a wide converter lens system embodying this invention.

FIG. 1 shows an example of the converter 20, comprised of several mutually coaxially arranged lenses which are, from the front, a plano-concave lens 21, a second concave lens 22, an achromatic double lens combination (lens unit) 23 and a plano-convex lens 24. They are all affixed to and supported by a frame 25 in a watertight and airtight manner such that no water will invade the inner spaces between the lenses.

The achromatic double lens combination 23 consists of a convex lens and a concave lens making a face-to-face contact with each other and serving to correct distortions. If it is of primary importance to reduce the production cost, this combination may be replaced by a single convex lens, but it is preferable to include such a double lens combination because such double lens combinations, although expensive, are capable of effectively eliminating subtle distortions of optical images in peripheral areas as well as color distortions when the field angle is increased.

The plano-concave lens 21 has its flat surface in the forward direction. The plano-convex lens 24 has its flat surface in the backward direction, facing the camera. Thus, the converter 20, as a whole, has both a flat front surface and a flat back surface such that a well-focused image can be obtained both under underwater and above-water conditions.

The backward end part of the frame 25 is adapted to be attached to the lens port (not shown in FIG. 1) of a housing containing the camera. The mechanism for the attachment may be of any commonly used type such as by screwing, in a bayonet form or by insertion. It is to be noted that this attachment is not an airtight or watertight attachment. Although not discernible in FIG. 1, the backward end part of the frame 25 is provided with a hole or a groove such that air or water, depending on the environment in which the camera is being used, can freely enter the unsealed space (indicated at 55 in FIGS. 2A and 2B) between the lens port of the camera housing and the back surface of the plano-convex lens 24. Such a passage, or passages, for air and water may be provided instead on the lens port of the camera housing. With the converter 20 thus formed, the user may not only attach it to the camera housing before going underwater and use it for underwater photography but also remove it while in water to continue taking pictures with a different field angle.

Figure 2A:
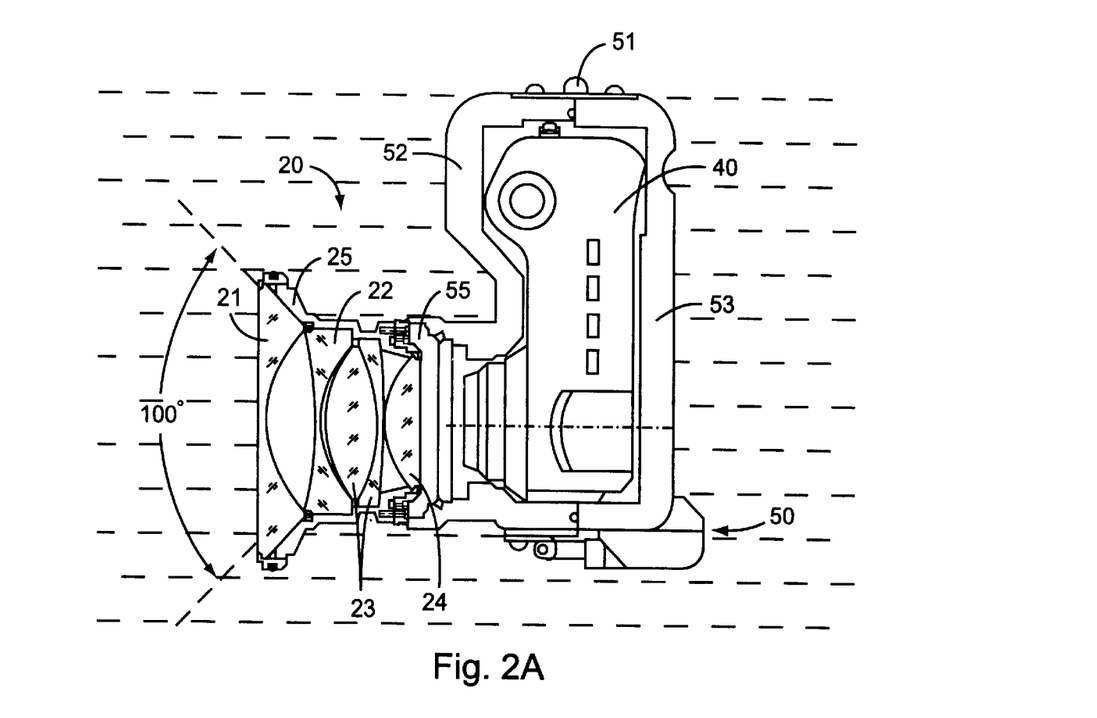
FIGS. 2A and 2B are sectional views of the converter of FIG. 1 attached to a camera in a watertight housing, being used respectively under an underwater condition and under an above-water condition.
Figure 2B:
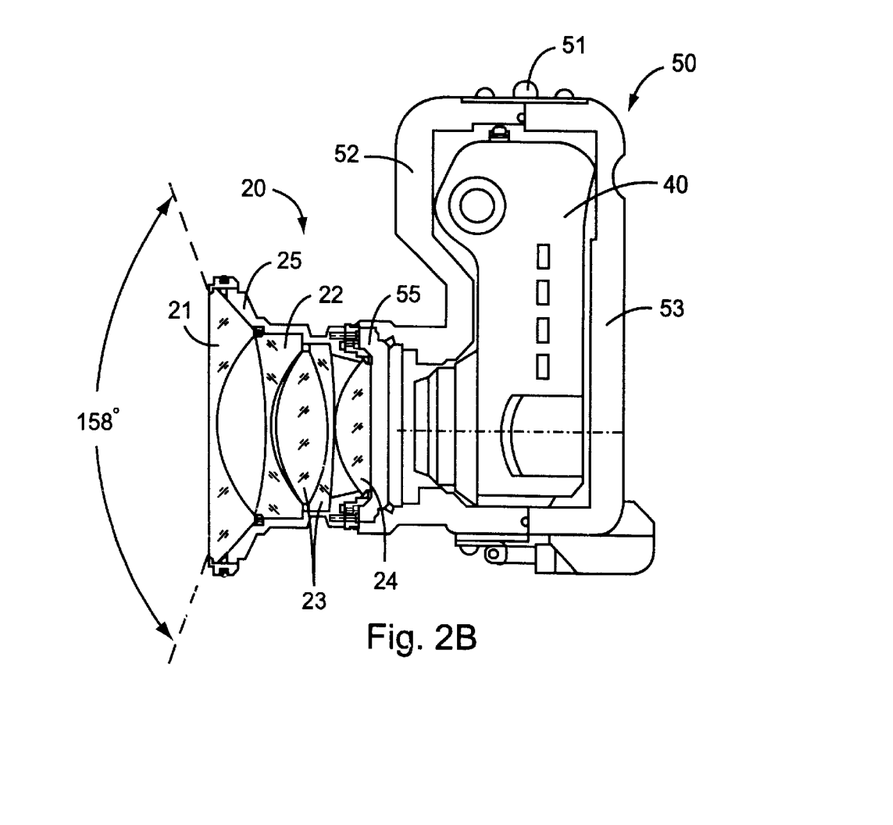
Figure 3A:
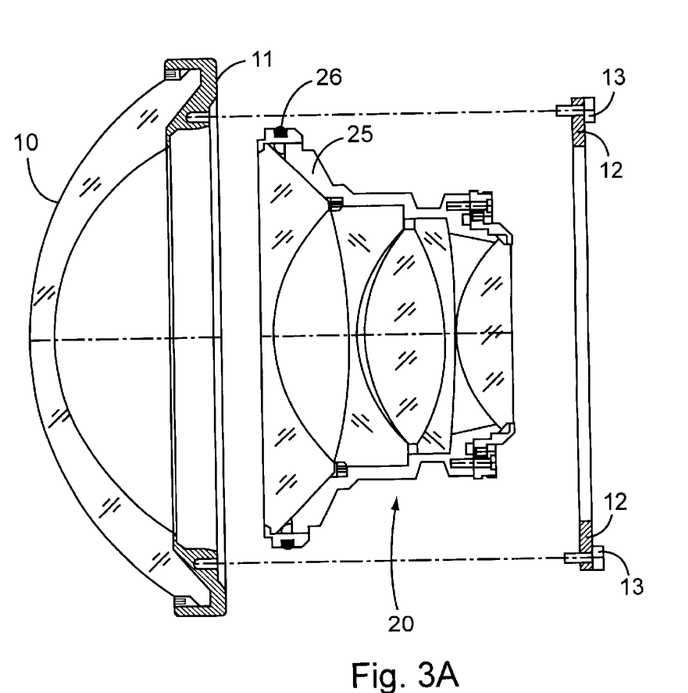
FIGS. 3A and 3B are respectively a sectional view of the wide converter lens system embodying this invention including the converter shown in FIG. 1 and a meniscus lens before and after they are attached to each other.
Figure 3B:
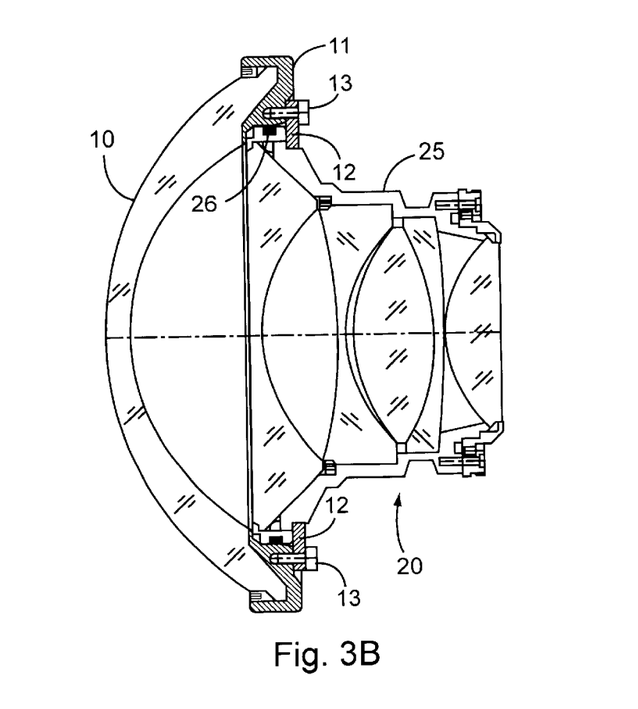
Figure 3C:
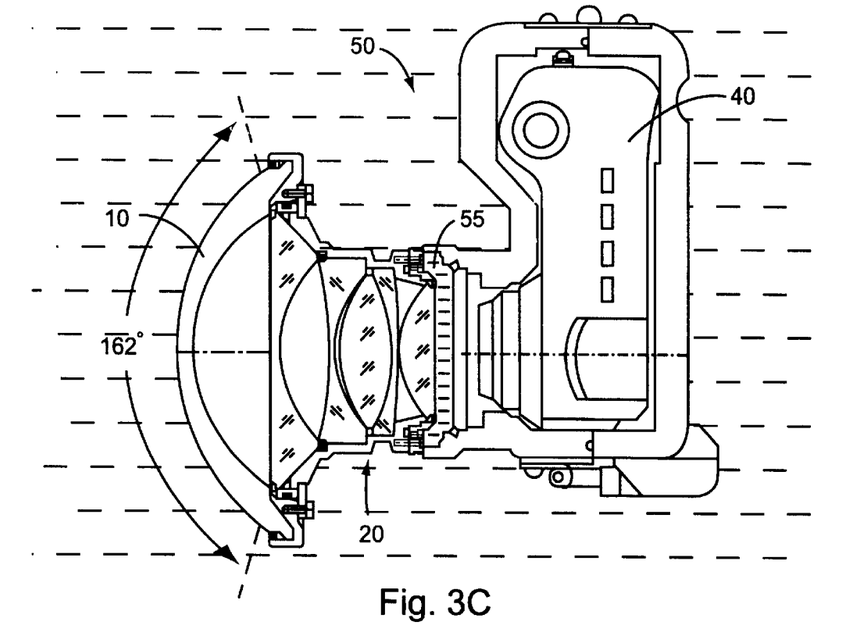
FIG. 3C is a sectional view of the wide converter lens system of FIG. 3B attached to a camera, being used in an underwater condition.

FIGS. 2A and 2B show the effects of the converter 20 on a camera 40 inside a watertight housing 50 for underwater photography, to which it is attached. FIG. 2A shows when it is being used in an underwater environment. FIG. 2B shows when it is being used in an above-ground environment. The housing 50 may be of a structure having hinges 51 connecting its front half 52 including the lens port and a back half 53 including a viewing window. The housing 50 can thus be opened in the middle. The camera 40 is put inside the housing 50 under the above-ground condition. Although not shown, an O-ring is provided between the front half 52 and the back half 53 such that the housing 50 can be closed to form a watertight enclosure after the two halves 52 and 53 are closed and locked.

There is a space 55 between the lens port on the housing 50 and the flat backward surface (facing the camera 40) of the plano-convex lens 24 of the converter 20. As shown in FIG. 2A, this space 55 is filled with water when the converter 20 is being used in an underwater environment. Because of the high index of refraction (1.33) of water, the field angle of the camera 40 is increased to about 100° which is about twice as large as the field angle of the camera 40 without the converter 20. Because the front surface of the plano-concave lens 21 and the back surface of the plano-convex lens 24 of the converter 20 are both flat (with an infinitely large radius of curvature) and parallel to each other, there is no lens-effect of water and hence the camera can be naturally focused through the viewer. In other words, the user can easily focus the camera to photograph a wide-angle view, say, of a huge group of fish or an immense expanse of underwater scenery.

Because the converter 20 is attached to the housing 50 of the camera 40 with a space 55 in between and not in an airtight or watertight manner, the user can freely remove and reattach the converter 20 from and to the housing 50, depending on the conditions and circumstances of underwater photography. When a young sea-horse of body length not much longer than 10 mm is found in a small gap in a coral-reef, for example, the user would probably remove the converter 20. If the user later wishes to reattach the converter 20, this can be done easily because the converter 20 according to the present invention is adapted to be attached to the exterior of the housing 50, unlike some of the prior art converters adapted to be attached directly to the camera 40 itself.

When the converter 20 is used under an above-ground condition, as shown in FIG. 2B, the space 55 between the converter 20 and the housing 50 of the camera 40, not being airtight or watertight, is no longer filled with water. In other words, it is air that surrounds the converter 20 both in front and at the back. Thus, the camera can again be focused naturally through its viewer. In the absence of water with its high index of refraction, the field angle in the above-ground condition is about 158°.

As explained above with reference to FIGS. 2A and 2B, the converter 30 can increase the field angle to about 158° under the above-ground condition but only to about 100° under the underwater condition because of the high index of refraction of water. The purpose of the attachment meniscus lens 10 is to further increase the field angle of the camera under underwater conditions, that is, the meniscus lens 10 is a non-positive lens and is shown as a negative lens throughout herein as an example.

A conventional mechanism for attaching various accessory parts to a camera may be used for the attachment of the meniscus lens 10 to the frame 25 of the converter 20. FIG. 3A shows a water-resistant O-ring 26 around the cylindrically shaped front end part of the frame 25. The meniscus lens 10 has a supporting lens frame 11 and a ring 12 which may be affixed to the lens frame 11 by means of screws 13 or the like for keeping the meniscus lens 10 sealingly attached to the frame 25 of the converter 20 with the O-ring 26 in between. FIG. 3B shows the meniscus lens 10 after being thus attached to the converter 20. The attachment of the meniscus lens 10 to the converter 20 is carried out before the camera is brought under water. Thus, water is prevented from entering the space between the meniscus lens 10 and the converter 20 even after the camera is taken under water, as shown in FIG. 3C. The radii of curvature of the surfaces of the meniscus lens 10 are such that the field angle of the camera as being used in FIG. 3B is as large as about 162°.

Figure 4A:
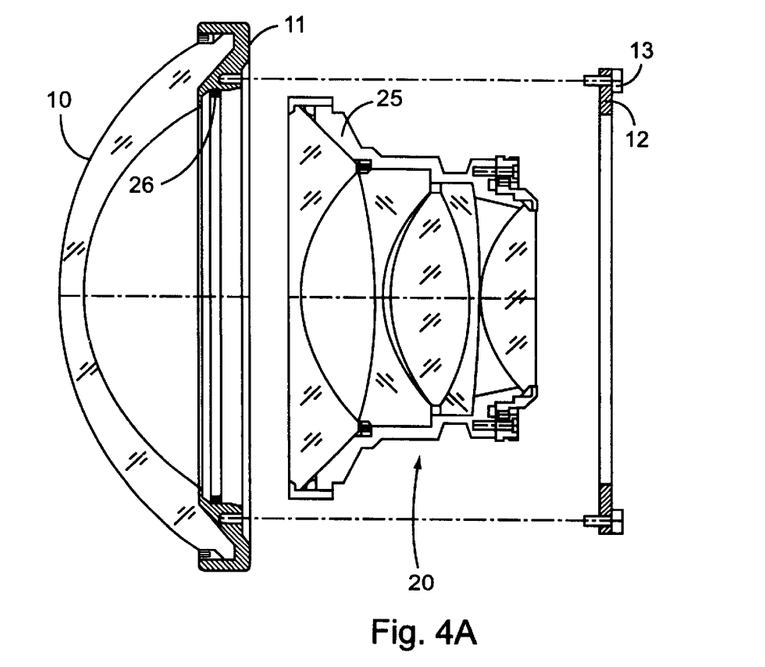
FIGS. 4A and 4B are respectively a sectional view of another wide converter lens system embodying this invention with a different mechanism for attaching the converter and the meniscus lens before and after they are attached to each other.
Figure 4B:
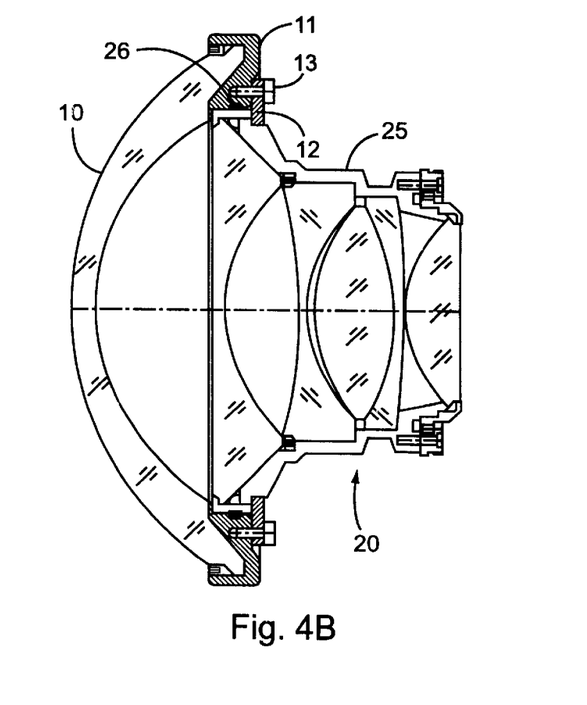

The water-resistant O-ring 26 need not be provided around the front end part of the frame 25. FIGS. 4A and 4B show a variation wherein the O-ring 26 is provided on the inner surface of a ring-shaped supporting lens frame 11. Both the O-ring 26, whether provided on the frame 25 of the converter 20 as shown in FIG. 3A or on the meniscus lens frame 11 as shown in FIG. 4A, and its counterpart against which the O-ring 26 is pressed to form a watertight and airtight seal will be hereinafter referred to together as the sealing means for detachably attaching the meniscus lens 10 to the converter 20.

As explained above, the meniscus lens 10 can be attached to the front of the converter 20 only under the above-ground condition but it can be detached under water. Thus, the field angle can be changed from the originally available magnitude of about 162° to about 100° by removing the meniscus lens 10 while remaining in the underwater condition and further down to about 50° by removing also the converter 20.

The invention has been described above with reference to only one example, but this example is not intended to limit the scope of the invention. Many modifications and variations are possible within the scope of the invention. As described above, for example, the achromatic double lens combination 23 may be replaced with a single convex lens in order to control the production cost of the converter 20. In certain situations, it may be totally eliminated. The second concave lens 22 may also be dispensed with. If the correction of distortions is very important, on the other hand, the number of lenses and lens units to be deployed between the foremost plano-concave lens 21 and the plano-convex lens 24 at the farthest back of the converter 20 may be increased. The plano-concave lens 21 and the plano-convex lens 24 themselves may each be formed as an achromatic lens combination comprising any plural number of single lenses pasted together.

Moreover, the plano-convex lens 24 at the farthest back end of the converter 20 may be replaced with an ordinary convex lens with the backward surface having a finite radius of curvature if the converter 20 is not intended to be used under an above-ground condition. In other words, as a simplest example, the converter 20 according to this invention may include only a plano-concave lens in front and one convex lens at the back inside the frame 25.

Figure 5:
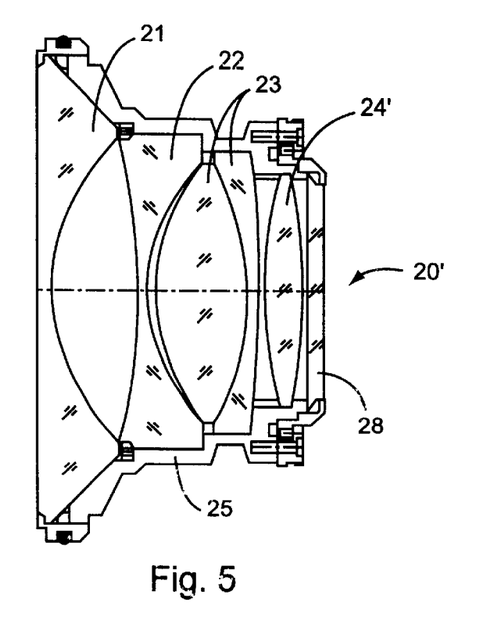
FIG. 5 is a sectional view of another converter provided with a flat plate as a portion of a wide converter lens system embodying this invention.
Figure 6A:
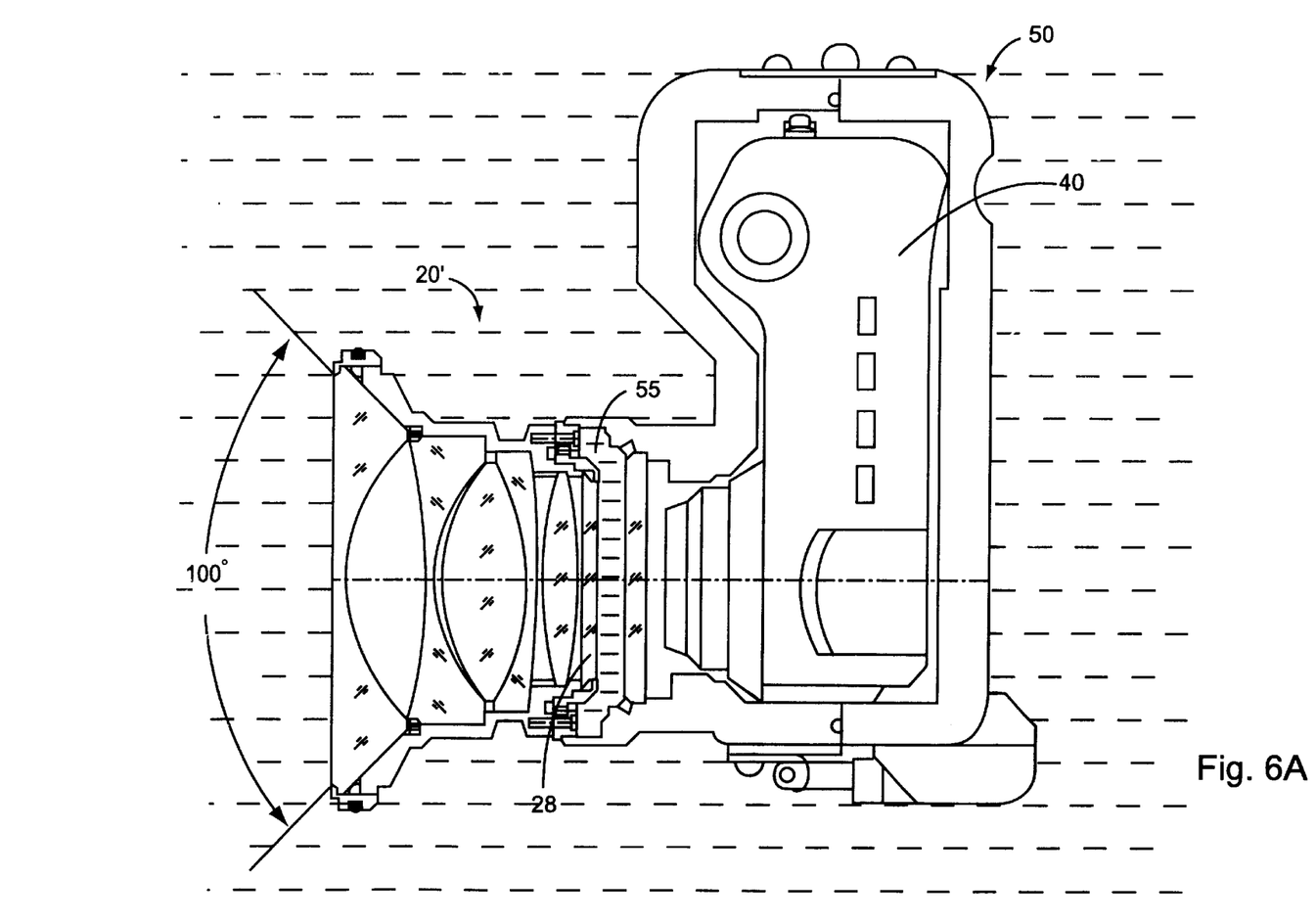
FIGS. 6A and 6B are sectional views of the converter of FIG. 5 attached to a camera in a watertight housing, being used respectively under an underwater condition and under an above-water condition.
Figure 6B:
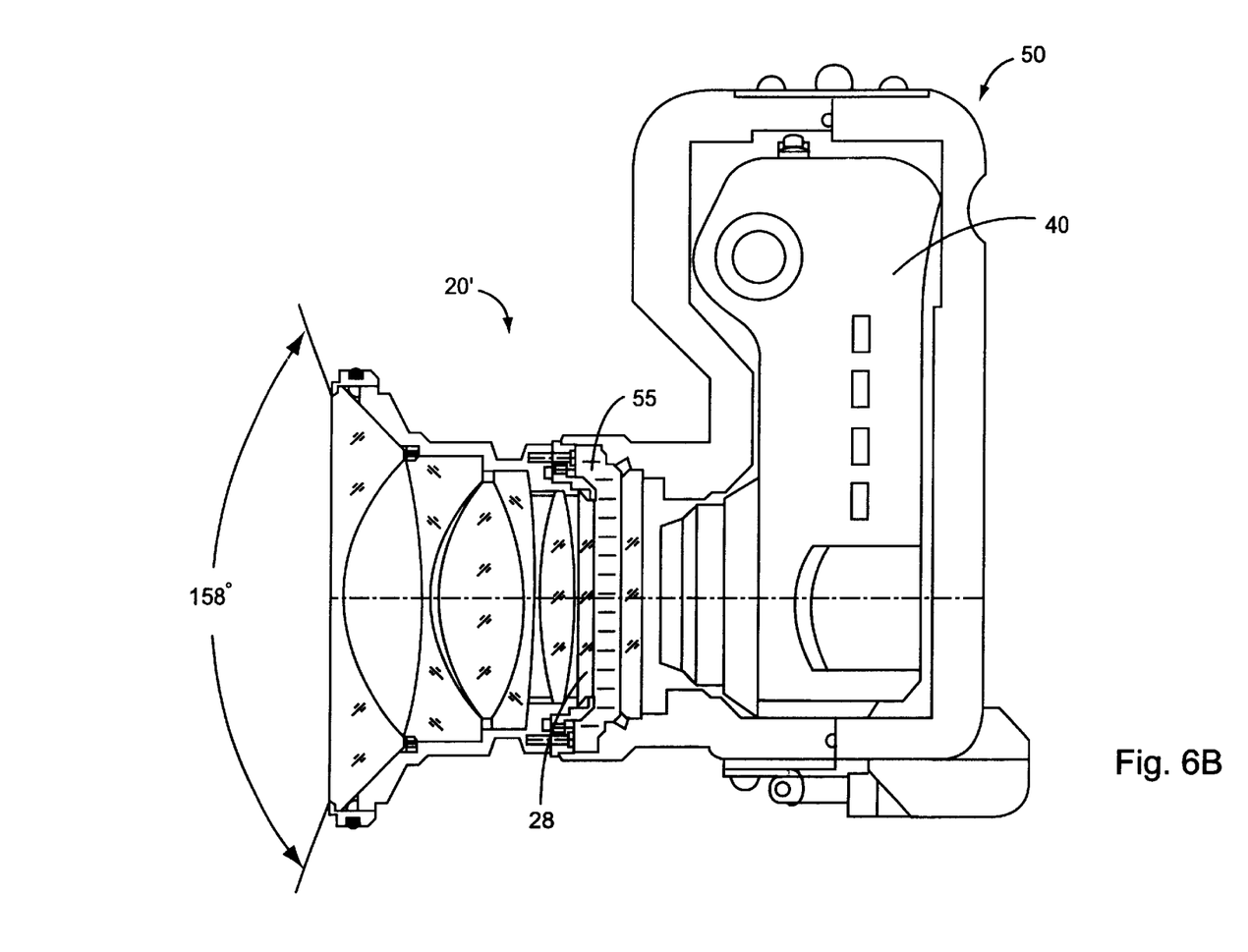

FIG. 5 shows another converter 20' of a different kind with a structure which may be characterized as having the plano-convex lens 24 shown in FIG. 1 replaced with an ordinary convex lens 24' and being provided with a transparent plate 28 with flat surfaces attached to the frame 25 in an airtight and watertight manner such that the converter 20' can function as a wide converter also in an above-water condition. For this purpose, the attachment of the converter 20' to the camera housing 50 should be such that there remains a space 55 between the camera and the plate, this space 55 being filled with water as shown in FIG. 6A when the system is being used under water and with air as shown in FIG. 6B when the system is being used under an above-water condition. The field angle, according to this example, is respectively 100° and 158° when it is used under an underwater condition and under an above-ground condition. The meniscus lens 10, as shown in FIGS. 3A, 3B and 3C may be similarly attached to the frame 25, although not separately shown, to further increase the field angle.

Although the object-facing lens of the converter 20, that is the farthest away from the camera, has been described as being a plano-concave lens, this it not strictly a requirement which limits the scope of this invention. Although not separately illustrated for the convenience of disclosure, the front surface of this object-facing lens need not be completely flat but may be of a finite curvature, as long as its radius of curvature is sufficiently large such that the converter 20, when attached to the camera housing as described above, can serve as a wide converter at least in water, having the effect of increasing the field angle of the camera when used in water.

Similarly, although the meniscus lens 10 has been described above as being a concave lens, neither is this a strictly required condition of the present invention. The invention does not prevent the meniscus lens 10 from being convex, as long as the wide converter lens system, with the meniscus lens 10 incorporated therein, serves as a wide converter capable of increasing the field angle of the camera in a desired manner.

What is claimed is:

1. A wide converter lens system for a camera inside a housing to increase the field angle of said camera, said wide converter lens system comprising:

a converter which is detachably attachable to said housing in a non-airtight, non-watertight manner, said converter having two or more coaxially arranged lens units, each of said lens units consisting of either a single lens or a plurality of lenses that are mutually attached in face-to-face relationships, said lens units including an object-facing lens unit having a negative refractive power and a camera-facing lens unit being respectively the farthest from and the closest to said camera when said converter is attached to said housing, said converter serving to increase the field angle of said camera in water; and a forwardly protruding meniscus non-positive lens having sealing means for detachably attaching said meniscus lens to said converter with a space sealed in between and maintained in a water-tight manner, said object-facing lens unit having a front surface distal from said camera, said front surface being non-concave and having a radius of curvature serves to increase the field angle of said camera in water.

2. The wide converter lens system of claim 1 wherein said object-facing lens unit is a plano-concave lens unit, said front surface being flat.

3. The wide converter lens system of claim 1 further comprising a transparent plate having flat surfaces, said plate being attached to said converter in a watertight manner and disposed between said camera and said converter, there being an unsealed space between said transparent plate and said housing whereby said wide converter lens system serves to increase the field angle of said camera also in air.

4. The wide converter lens system of claim 2 further comprising a transparent plate having flat surfaces, said plate being attached to said converter in a watertight manner and disposed between said camera and said converter, there being an unsealed space between said transparent plate and said housing whereby said wide converter lens system serves to increase the field angle of said camera also in air.

5. The wide converter lens system of claim 1 wherein said camera-facing lens unit has a back surface facing towards said camera, said back surface being flat, wherein said wide converter lens system serves to increase the field angle of said camera also in air.

6. The wide converter lens system of claim 2 wherein said camera-facing lens unit has a back surface facing towards said camera, said back surface being flat, wherein said wide converter lens system serves to increase the field angle of said camera also in air.

7. The wide converter lens system of claim 4 wherein said forwardly protruding meniscus lens serves to further increase the field angle of said camera with said converter attached thereto.

8. The wide converter lens system of claim 5 wherein said forwardly protruding meniscus lens serves to further increase the field angle of said camera with said converter attached thereto.

9. A meniscus lens attachment comprising a meniscus non-positive lens and a frame which supports said meniscus lens, said frame having sealing means for detachably attaching said frame to a converter in a watertight manner, said converter being attachable to a housing which contains therein a camera to thereby increase the field angle of said camera, wherein said meniscus lens, being attached to said converter, serves to increase the field angle of said camera both in water and in air.

10. The meniscus lens attachment of claim 9 wherein said converter includes two or more coaxially arranged lens units, each of said lens units consisting of either a single lens or a plurality of lenses that are mutually attached in face-to-face relationships, said lens units including an object-facing lens unit having a negative refractive power and a camera-facing lens unit having a positive refractive power, said object-facing lens unit and said camera-facing lens unit being respectively the farthest from and the closest to said camera when said converter is attached to said housing.

11. The meniscus lens attachment of claim 9 wherein said meniscus lens serves to further increase the field angle of said camera with said converter attached thereto.

12. The meniscus lens attachment of claim 10 wherein said meniscus lens serves to further increase the field angle of said camera with said converter attached thereto.

13. The meniscus lens attachment of claim 11 wherein said sealing means includes an O-ring provided around said converter.

14. The meniscus lens attachment of claim 12 wherein said sealing means includes an O-ring provided around said converter.

15. The meniscus lens attachment of claim 11 wherein said sealing means includes an O-ring provided in said frame.

16. The meniscus lens attachment of claim 12 wherein said sealing means includes an O-ring provided in said frame.

* * * * *